United States Patent Office 3,190,838
Patented June 22, 1965

3,190,838
CATALYST SYSTEMS COMPRISING ALUMINUM TRIHALIDE NITROMETHANE AND A THIRD COMPONENT
Henricus M. Buck and Luitzen J. Oosterhoff, Leiden, Netherlands, and John H. Lupinski, Schenectady, N.Y., assignors to Shell Oil Company, New York, N.Y., a corporation of Delaware
No Drawing. Filed Dec. 5, 1960, Ser. No. 73,521
Claims priority, application Great Britain, Dec. 7, 1959, 41,481/59; Aug. 25, 1960, 29,379/60, 29,380/60
6 Claims. (Cl. 252—429)

This invention relates to improved catalyst systems and more particularly to improvements in such systems which comprise an inorganic halide as one of the catalytic components thereof.

It is known that inorganic halides such as Friedel-Crafts compounds can be used as catalysts in a multitude of chemical reactions between organic compounds. Most prominent among these halide catalysts is aluminum trichloride, which is widely used for such diverse reactions as alkylation, polymerization and isomerization reactions. However, other inorganic halides such as halides of tin, arsenic, antimony and iron display similar catalytic properties, although their activity is generally less than that of aluminum trichloride.

It has also been proposed to carry out chemical reactions with inorganic halide catalysts in the presence of suitable solvents, such as nitrohydrocarbons, in particular nitroparaffins such as nitromethane or nitro-aromatic compounds such as nitrobenzene. For instance, good results have been obtained in the alkylation of benzene with olefins or with alkylchlorides by using nitromethane or 2-nitropropane as a solvent for the aluminum trichloride catalyst.

It has now been found that the catalytic activity of systems containing both inorganic halides and suitable solvents thereof can be greatly enhanced by adding to the system an oxidizing agent and/or a proton acid (as herein after defined) and/or an anhydride of a proton acid.

Accordingly, the invention is one for a catalyst system comprising (a) one or more inorganic halides, (b) one or more solvents of said inorganic halide(s) and (c) one or more oxidizing agents and/or one or more proton acids and/or one or more anhydrides of proton acids.

The invention also provides a method of carrying out chemical reactions between organic compounds, using as a catalyst a system as described in the preceding paragraph.

Although the invention is primarily to be used with aluminum trichloride as the halide component of the system, other inorganic halides and especially those of known catalytic activity may be used instead of or as well as aluminum trichloride. In general the inorganic halides to be used in the present catalyst systems are one or more halides of the elements of Groups IIB, IIIA, IV, VA and VIII of the periodic table;[1] which are commonly referred to as "Lewis acids." Thus, in the systems according to the invention good results have not only been obtained with alunum trichloride as the halide component of the catalyst, but also with aluminum tribromide and with the chlorides of iron, antimony, tin, titanium and zinc, though there are marked differences between the catalytic activities of these compounds.

As a solvent for the inorganic halide, generally all polar liquids which do not substantially react with or cause deterioration to the inorganic halide can be used. Preferred solvents are nitrohydrocarbons. The nitrohydrocarbon solvent may be a nitroparaffin such as nitromethane, nitroethane, 1-nitropropane or 2-nitropropane or it may be an aromatic nitro compound such as nitrobenzene or one of the three isomeric nitrotoluenes; mixtures of two or more of such compounds may also be used. Other suitable solvents are nitriles such as acetonitrile.

The oxidizing agent to be used in the catalyst of the present invention is preferably one which is to some extent soluble in or miscible either completely or in part with the solvent. Generally there is no objection against the oxidizing agent being present in a separate solid or liquid phase. Preferred oxidizing agents are the inorganic salts of chloric acid, nitric acid and nitrous acid, particularly the alkali metal salts such as sodium or potassium chlorate, nitrate or nitrite, and further the chlorates, nitrates and nitrites of alkaline earth metals and ammonium. Another group of preferred oxidizing agents are tetranitromethane, 1.3.5-trinitrobenzene, picric acid and other polynitro compounds. Other suitable oxidizing agents are several nitrogen oxides, such as NO and $NO_2$, further nitrosylboronfluoride, $NOBF_4$, and nitroniumboronfluoride, $NO_2BF_4$, and further also halogen oxides, such as $ClO_2$.

By the term "proton acid" is meant an acid which when dissolved in water results in the formation of hydroxonium ions ($H_3O^+$). Such acids therefore include the common mineral acids. Suitable proton acids which may be used in the catalyst of the present invention are for instance phosphoric acid, sulphuric acid, nitric acid or hydrochloric acid. As an example of a proton acid anhydride is phosphorous pentoxide which is very effective, but other anhydrides may also be used.

The reactions in which the present catalyst systems are used are in some cases advantageously carried out in the presence of solvents additional to those mentioned above. Examples of such additional solvents which may be used are aromatic hydrocarbons, for example benzene or toluene, or carbon tetrachloride or tetrachloroethane. Generally it is preferred to use aromatic hydrocarbons.

The presence of very small amounts of water often causes the catalyst system to be more active than when completely dry. Suitable water contents as a rule are below 0.5% by weight.

Reactions, which are advantageously carried out in the presence of the catalyst systems of the invention are the alkylation of aromatic hydrocarbons with olefins, the isomerization of alkanes, particularly normal alkanes and the polymerization of unsaturated compounds, particularly olefinically unsaturated hydrocarbons. Thus, for example, the polymerization of conjugated dienes such as butadiene has been found to proceed particularly rapidly using the catalyst systems of the invention.

When aluminum trichloride is used as the halide component of the catalyst system, the activity of the system may be so great, that it is desirable to work at rather low temperatures in order to control the rate of the reaction. The reactions are often for instance carried out at a temperature between 0 and 20° C., although for very active systems much lower temperatures, for example as low as —80° C., may sometimes be preferred. Using less active halide components it may be necessary to heat the reaction mixture in order to initiate the reaction. It is also possible to activate the catalyst system by irradiation for example with ultra-violet light.

The main advantage of the present catalyst systems over the older systems in which no oxidizing agent or proton acid or anhydride thereof has been present is that as a result of the enhanced activity of the catalysts of the invention it is possible to use much lower catalyst concentrations, thereby facilitating the removal of the residual catalyst components from the products of the reaction.

Although it is not desired to limit the present invention to any particular explanation of the enhanced activity

[1] See Periodic Chart of the Elements published by Fisher Scientific Company; see also Handbook of Chemistry and Physics published by Chemical Rubber Publishing Company, Cleveland, Ohio, 41st edition.

of the systems containing an oxidizing agent or a proton acid or anhydride thereof, as compared to the activity of the catalyst systems of the prior art, it is believed that this enhanced activity may be due to the strong electron abstracting activity of the systems of the invention, whereby the formation of positive ions from organic compounds is facilitated.

The invention will now be illustrated by the following examples in which all quantities are expressed as parts by weight. Before its use the nitromethane mentioned in the examples was twice subjected to the following sequence of treatments: drying with calcium chloride, filtering and then distilling in the presence of fresh calcium chloride.

*Example 1*

A catalyst system dissolved in 390 parts of benzene was prepared from 41 parts of anhydrous aluminum trichloride, 23 parts of nitromethane and 26 parts of potassium nitrite as oxidizing agent, that is from approximately equimolar quantities of the three catalyst components.

Samples of butadiene were readily polymerized at a temperature of 0° C. using the above system and the activity of the catalyst system in such a reaction was shown to be considerably higher than the activity of a similar system which omitted the potassium nitrite from the catalyst system.

*Example 2*

A similar catalyst system as used in Example 1 was prepared in 174 parts of benzene from 10 parts of aluminum trichloride, 5.7 parts of nitromethane and 5 parts of potassium nitrite as oxidizing agent. This system was also shown to polymerize butadiene readily at 0° C. and to have a much higher catalytic activity in such a reaction than does a similar system from which the potassium nitrite had been omitted.

*Example 3*

Other catalyst systems of the invention were prepared from aluminum tribromide and nitromethane, using tetranitromethane and potassium nitrate respectively as the oxidizing agents. Such systems were shown to have enhanced catalytic activity as compared to similar systems from which the oxidizing agent had been omitted.

*Example 4*

A catalyst system was prepared by dissolving 35 parts of anhydrous aluminum trichloride, 20 parts of nitromethane and 8 parts of potassium chlorate in 400 parts of benzene.

Samples of butadiene were readily polymerized at a temperature of 0° C. using the catalyst system as prepared above and the activity of the catalyst system in this reaction was shown to be considerably higher than the activity of a similar system in which potassium chlorate had been omitted.

*Example 5*

A catalyst system was prepared by dissolving 40 parts of anhydrous aluminum trichloride, 25 parts of nitromethane and 20 parts of phosphorous pentoxide in 400 parts of benzene Samples of butadiene were readily polymerized at a temperature of 10° C. using the catalyst system as prepared above and the activity of the catalyst system in this reaction was shown to be considerably higher than the activity of a similar system in which the phosphorous pentoxide had been omitted.

We claim as our invention:

1. A catalyst composition comprising an aluminum trihalide, nitromethane and at least one compound selected from the group consisting of tetranitromethane, potassium nitrate, potassium nitrite, potassium chlorate and phosphorous pentoxide wherein the components are present in approximately equimolar quantities.

2. A catalyst composition comprising an aluminum trihalide, nitromethane and at least one compound selected from the group consisting of tetranitromethane, potassium nitrate, potassium nitrite, potassium chlorate and phosphorous pentoxide wherein the components are present in molar proportions varying from approximately 1:1:0.2 to 1:1:1, respectively.

3. A catalyst composition according to claim 2 in which said selected compound is potassium chlorate.

4. A catalyst composition according to claim 2 in which said selected compound is potassium nitrate.

5. A catalyst composition according to claim 2 in which said selected compound is phosphorous pentoxide.

6. A benzene solution of a catalyst composition comprising equimolar quantities of aluminum trichloride, nitromethane and potassium nitrite.

References Cited by the Examiner

UNITED STATES PATENTS

| | | | |
|---|---|---|---|
| 2,385,303 | 9/45 | Schmerling | 252—429 |
| 2,631,172 | 3/53 | Schmerling | 252—429 |
| 2,824,150 | 2/58 | Knight et al. | 260—683.44 |
| 2,840,527 | 6/58 | Brennan et al. | 252—442 |
| 2,879,263 | 3/59 | Anderson et al. | 260—94.9 |
| 2,890,997 | 6/59 | Hirschler | 208—93 |
| 2,925,392 | 2/60 | Seelbach et al. | 252—429 |
| 2,947,794 | 8/60 | Petropoulos et al. | 252—429 |

TOBIAS E. LEVOW, *Primary Examiner.*

JULIUS GREENWALD, *Examiner.*